(12) United States Patent
Beneker et al.

(10) Patent No.: US 9,315,117 B2
(45) Date of Patent: Apr. 19, 2016

(54) METHOD FOR PRODUCING A SPINDLE DRIVE OF AN ADJUSTMENT DEVICE OF A MOTOR VEHICLE SEAT

(71) Applicant: C. Rob. Hammerstein GmbH & Co. KG, Solingen (DE)

(72) Inventors: Wilfried Beneker, Leichlingen (DE); Ivica Stanic, Dormagen (DE)

(73) Assignee: C. ROB. HAMMERSTEIN GMBH & CO. KG (DE)

( * ) Notice: Subject to any disclaimer, the term of this patent is extended or adjusted under 35 U.S.C. 154(b) by 293 days.

(21) Appl. No.: 14/039,966

(22) Filed: Sep. 27, 2013

(65) Prior Publication Data

US 2014/0026391 A1    Jan. 30, 2014

Related U.S. Application Data

(62) Division of application No. 12/699,099, filed on Feb. 3, 2010, now Pat. No. 8,544,353.

(30) Foreign Application Priority Data

Feb. 5, 2009   (DE) .......................... 10 2009 007 610

(51) Int. Cl.
| | |
|---|---|
| *B21D 53/88* | (2006.01) |
| *B60N 2/06* | (2006.01) |
| *B60N 2/44* | (2006.01) |
| *F16H 25/24* | (2006.01) |

(52) U.S. Cl.
CPC ............... *B60N 2/067* (2013.01); *B21D 53/88* (2013.01); *B60N 2/443* (2013.01); *F16H 25/24* (2013.01); *B23P 2700/11* (2013.01); *Y10T 29/49904* (2015.01); *Y10T 29/49908* (2015.01); *Y10T 74/18576* (2015.01); *Y10T 74/20498* (2015.01)

(58) Field of Classification Search
CPC ................... Y10T 29/49904; Y10T 29/49925; Y10T 29/49927; Y10T 29/49929; Y10T 74/18096; Y10T 74/20504
USPC .................................................. 74/89.23, 504
See application file for complete search history.

(56) References Cited

U.S. PATENT DOCUMENTS

| | | |
|---|---|---|
| 3,178,957 A | 4/1965 | Martens |
| 3,490,062 A | 1/1970 | Wagner et al. |
| 3,989,400 A | 11/1976 | Smith et al. |
| 4,232,712 A | 11/1980 | Squires |
| 5,222,402 A | 6/1993 | White et al. |
| 6,260,922 B1 | 7/2001 | Frohnhaus et al. |
| 6,464,421 B1 | 10/2002 | Kiefer |
| 7,340,974 B2 | 3/2008 | Landskron et al. |

FOREIGN PATENT DOCUMENTS

| | | | |
|---|---|---|---|
| DE | 1 755 740 A1 | 1/1972 | |
| SE | WO 03056226 A1 * | 7/2003 | ............ F16L 13/143 |
| WO | WO-86/06036 A1 | 10/1986 | |

* cited by examiner

*Primary Examiner* — Jermie Cozart
(74) *Attorney, Agent, or Firm* — McCarter & English, LLP

(57) ABSTRACT

In the method for producing a spindle drive of an adjustment device of a motor vehicle seat, the adjustment device comprises a spindle and a nut unit. The nut unit comprises a nut made from plastic and a retainer in which the nut is retained. The nut has an internal thread which is in engagement with the spindle and has recesses in its outer jacket. The method comprises the following steps: the tube section is pushed over the nut during assembly, the nut is located within the tube section, the tube section, in the areas in which the recesses of the nut are located, is deformed into the area of the recesses and a portion of material of the tube section is located in the recesses.

15 Claims, 7 Drawing Sheets

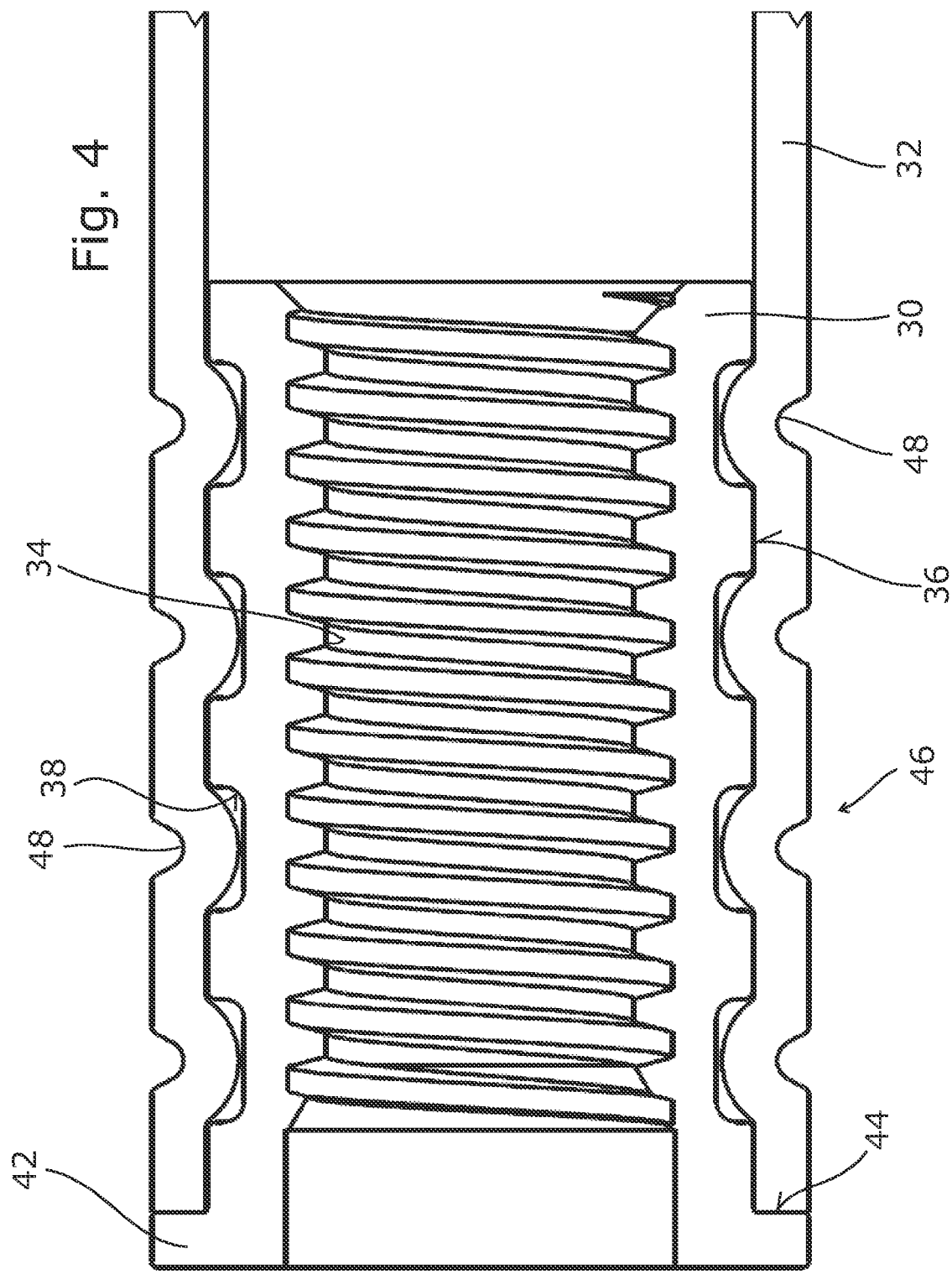

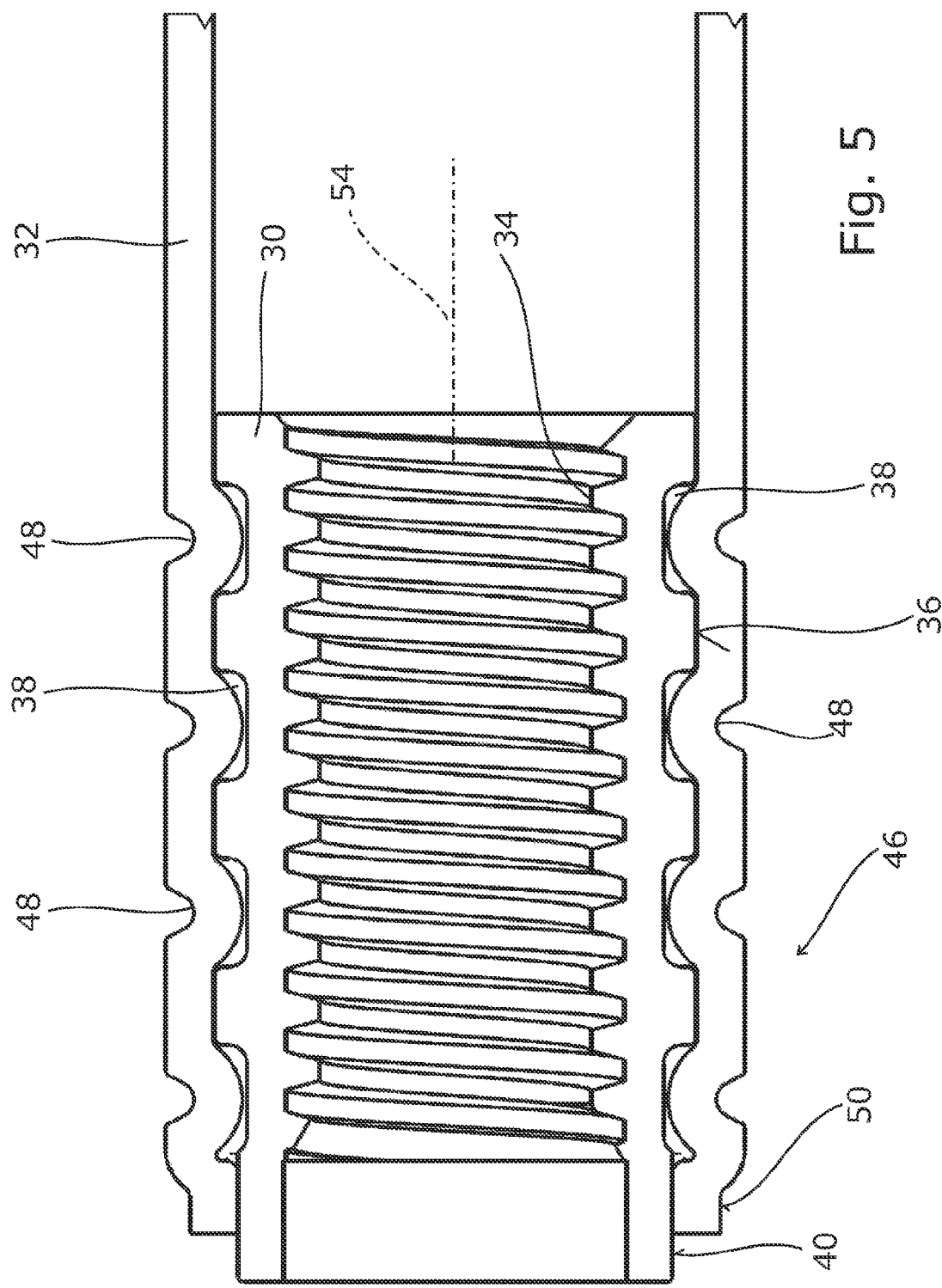

METHOD FOR PRODUCING A SPINDLE DRIVE OF AN ADJUSTMENT DEVICE OF A MOTOR VEHICLE SEAT

CROSS-REFERENCE TO RELATED APPLICATIONS

This patent application is a divisional of U.S. patent application Ser. No. 12/699,099, filed Feb. 3, 2010, now U.S. Pat. No. 8,544,353, claiming priority under 35 U.S.C. §119(a)-(d) to German Patent Application No. DE 10 2009 007 610.7, filed Feb. 5, 2009, all of which are hereby expressly incorporated by reference in their entirety as part of the present disclosure.

FIELD OF THE INVENTION

The invention relates to a method for producing a spindle drive of an adjustment device of a motor vehicle seat, comprising a spindle and a nut unit, wherein the nut unit comprises a nut made from plastic and a retainer, the nut has an internal thread which is in engagement with the spindle, and the nut is retained in the retainer.

BACKGROUND OF THE INVENTION

Such a spindle drive is known from U.S. Pat. No. 5,222,402. In this case, the spindle is motor-driven, the nut unit is stationary. The invention preferably relates to a spindle drive in which the spindle is actively motor-driven. With regard to the prior art, reference is also made to DE 1 755 740 A1, WO 86/06036, U.S. Pat. No. 6,260,922 B1 and U.S. Pat. No. 7,340,974 B2. In these known spindle drives, the nut unit is actively driven.

Nuts made from plastic are already known; in this regard, reference is made to the above-mentioned WO 86/06036. It shows a nut made from hard plastic comprising an outer jacket limited by a cylinder. In the generic U.S. Pat. No. 5,222,402, which describes a motor drive of the spindle, the cross section of the nut, in contrast, is rectangular, and the inner space of a lower rail of the longitudinal adjustment device forms the retainer, i.e., a non-rotatable accommodation of this nut. In this case, assembly entails a lot of effort because the drive, and thus the spindle, is allocated to the upper rail, but the output with the nut unit is allocated to the lower rail. Advantageously, the protected arrangement in this case lies within a channel limited by the two rails.

A universal use of spindle drive is desirable. Preferably, they are configured as ready-to-use assembly units. They have two assembly areas at which they are connected with the parts that are to be adjusted relative to each other.

SUMMARY OF THE INVENTION

This is where the invention comes in; it has set itself the object of developing and improving the spindle operation of the kind mentioned in the introduction in such a way that the connection between the retainer and the nut, and thus the configuration of the nut unit, is simplified and that the spindle drive can be configured as a ready-to-use assembly group.

Based on the spindle drive of the type mentioned in the introduction, this object is achieved, for example, by a method for producing a spindle drive of an adjustment device of a motor vehicle seat, the adjustment device comprises a spindle and a nut unit, the nut unit comprises a nut made from plastic and a retainer in which the nut is retained, and the nut has an internal thread which is in engagement with the spindle, the nut has recesses in its outer jacket, where the method comprises the following steps:
the tube section is pushed over the nut during assembly, the nut is located within the tube section,
the tube section, in the areas in which the recesses of the nut are located, is deformed into the area of the recesses and a portion of material of the tube section is located in the recesses.

The invention enables a particularly advantageous connection of the retainer with the nut. It makes it possible that both can be manufactured from different materials, but also makes it possible that the tube is formed from plastic. The invention makes it possible to use a tube section with a relatively thin wall thickness. No special processing steps, such as cutting a thread or the like, have to be carried out on the tube section itself. The tube section advantageously can be used for covering the part of the spindle beyond the nut which faces away from the motor drive, so that no special devices are required for preventing jamming or the collection of dirt at that area. The tube section can advantageously be provided or connected with an attachment area. Advantageously, this is coaxial.

The tube section is deformed for the connection between the tube section and the nut. The connection is a positive-fit connection. In this case, the fact that the tube section may have a thin wall thickness, which not only makes it light but also simplifies the deformation step, has a particularly advantageous effect.

In principle, the recesses can be configured in any way, formed such that the material of the tube section can be deformed into them in an advantageous way and that a good mechanical connection is achieved. Recesses that are configured as peripheral furrows are advantageous. The recesses preferably are formed by at least one depression, e.g., by an at least partially peripheral furrow. The furrow may have a pitch like a thread; preferably, it does not have a pitch. By a simple rolling process, the tube section can be deformed such that material of the tube section is located in the furrow. In this case, several furrows can be arranged axially one behind the other. A great strength of the connection and a freedom from clearance between the nut and the tube section in the axial direction is thus achieved.

In an advantageous configuration, the recesses have at least one non-round contact surface. Non-round is understood to mean in this case that the contact surface in the radial plane does not extend in the circumferential direction, that is, not tangentially. After the deformation of the tube section, it rests against the contact surface. The nut is thus prevented from rotating relative to the tube section. Advantageously, the contact surface runs on the line of a secant.

Normally, the tube section and the nut have the same axis. This is advantageous because in that case, the attachment area of the nut unit can also be coaxial. However, the nut and the tube section do not necessarily have to be coaxial.

The invention enables a cost-effective and simple connection of the tube section and the nut manufactured of plastic. The necessary step of deforming the tube section can be carried out in a simple way. For example, a rolling process, an embossing process or a roller burnishing process may be carried out. Common methods as known from standard textbooks can be used. The invention is advantageous in that the axial strength of the connection between the nut and the tube section and the torsion resistance of this connection can be separately adjusted and adapted to the respective requirements.

The recesses formed on the nut are configured in such a way that they can be realized as easily as possible during the production process of the nut. In this case, peripherally extending furrows are particularly suitable. They can also be produced later in a lathing process. Moreover, such non-round con-tact surfaces are provided for the torsion protection which can be easily realized, for example a secant surface.

Other advantages and features of the invention become apparent from the claims as well as from the following description of exemplary embodiments of the invention, which are to be understood not to be limiting, and which will be explained below with reference to the drawing.

BRIEF DESCRIPTION OF THE DRAWINGS

FIG. 4 shows an axial sectional view through the area of the nut unit shown in FIG. 2, FIG. 5 shows an axial sectional view, like FIG. 4, through the area of a nut unit according to another embodiment

DETAILED DESCRIPTION OF EMBODIMENTS OF THE INVENTION

Figure 1:
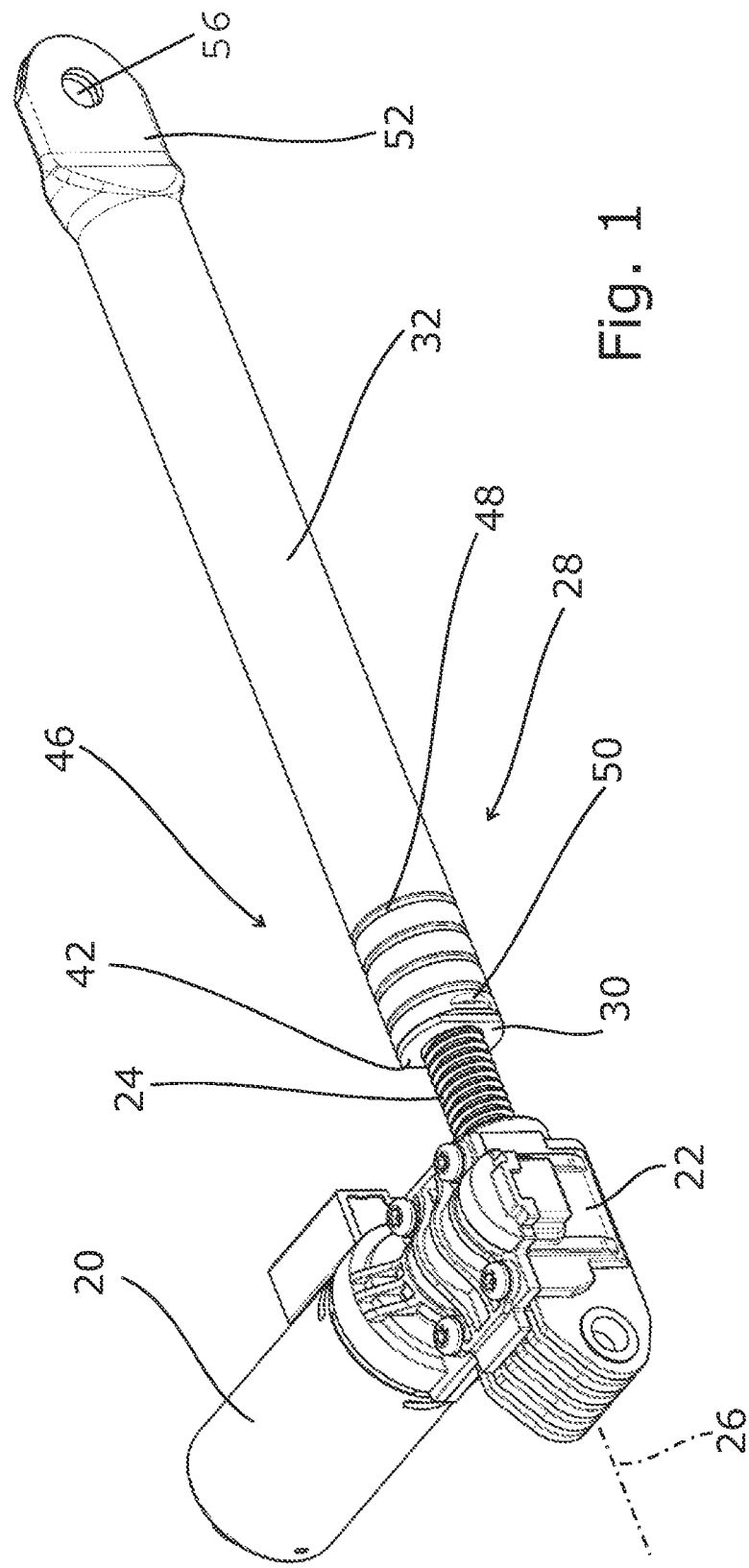
FIG. 1 shows a perspective view of a spindle drive of an adjustment device of motor vehicle seat.

FIG. 1 shows an electric motor 20 which drives a spindle 24 via an angle transmission 22. It comprises a spindle axis 26 which is perpendicular to the motor rotation axis. Typically, the spindle has a thread M10 to M14. The length of the spindle 24 is adapted in a known manner to the required adjustment distance or adjustment angle.

The spindle 24 is in engagement with a nut unit 28. The latter comprises a nut 30 manufactured from plastic and a tube section 32. The tube section 32 encloses the nut 30 with as precise a fit as possible.

The nut has an internal thread 34 which is in engagement with the spindle 24. It has an outer jacket 36 which is concentric with the internal thread 34 and limited by a cylinder. In the configuration shown here, this cylinder corresponds to the inner space of the undeformed tube section 32. Recesses 38, 40 are provided in the outer jacket 36. The recesses 38 are defined so as to extend in the circumferential direction; in an alternative, they extend at an acute angle to the circumferential direction. They are responsible for absorbing forces in the axial direction. In contrast, the recesses 40 are non-round; they are provided for absorbing forces acting in the circumferential direction, and ultimately for torsion protection.

Figure 3:
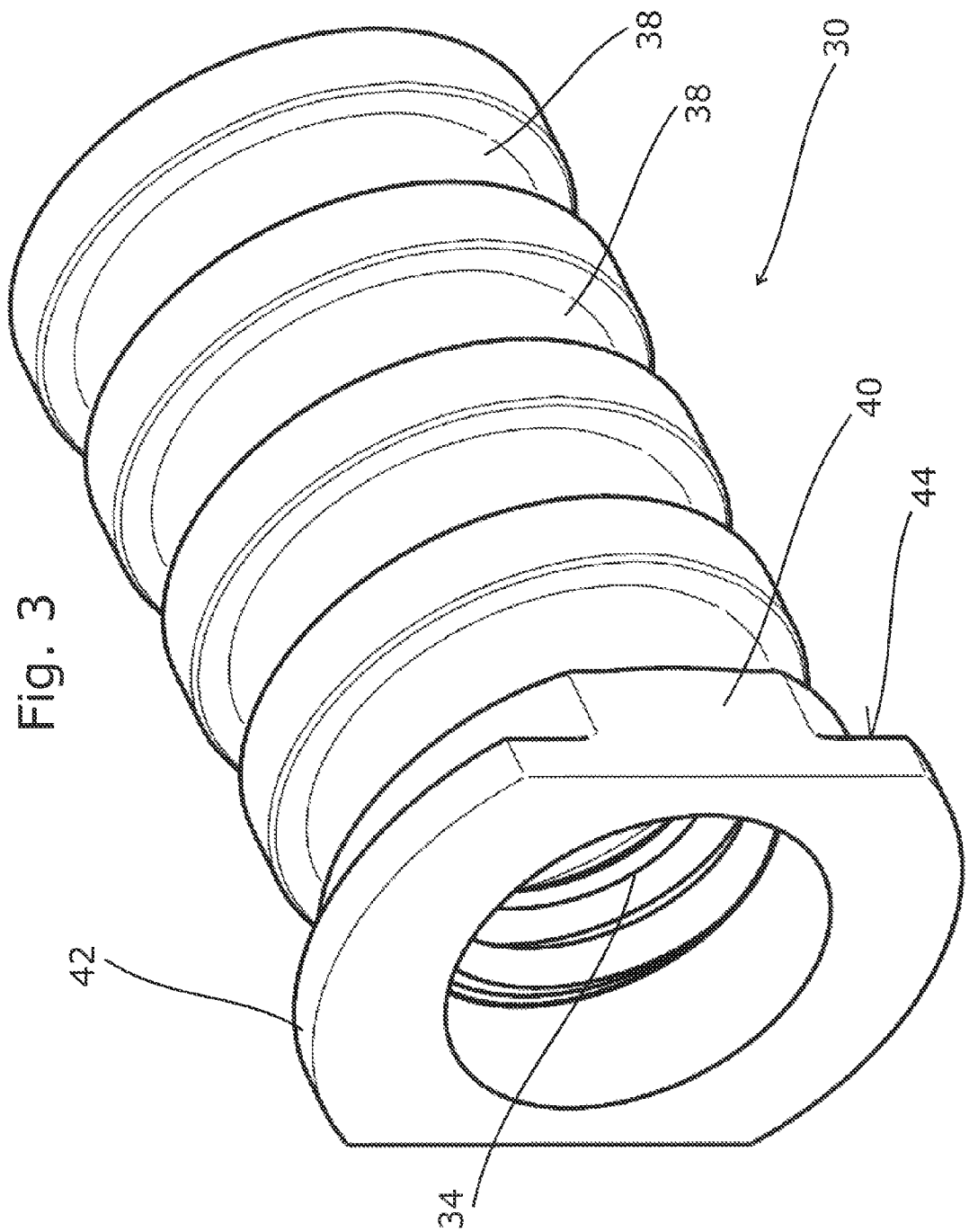
FIG. 3 shows a perspective view of a nut as may be used in the nut unit of FIG. 1.

Preferably, the recesses 38 are configured as a furrow. As FIG. 3, in particular, shows, the nut 30 has a total of four furrows 38. Areas of the undisrupted outer jacket are located between these four furrows. These areas are axially about 5 to 50% shorter than the furrows 38.

At its front first end portion, the nut has a shield 42. The latter has larger external dimensions than the inner space of the tube section 32; it is preferably limited by a cylinder corresponding to the outer jacket of the tube section. The shield forms a stop 44 against which a first end portion 46 of the tube section can abut, as can best be seen from FIG. 4. The shield 42 and the adjacent area of the rest of the nut 30 have two contact surfaces 40 offset relative to each other by 180°. Seen in the axial direction, they each extend on a secant. Axis 54 is the axis of the nut 30.

The tube section 32 is preferably made from metal, in particular steel. However, non-ferrous metals, e.g., light metal, are also possible. The tube section 32 can also be manufactured from a non-metal, for example, plastic. In the case of steel, the wall thickness is 1 to 1.5 mm. In the case of other materials, the wall thickness is correspondingly adapted to have the same strength. The tube section 32 is manufactured from a material which can be deformed well, for example cold-formed or hot-formed.

Figure 2:
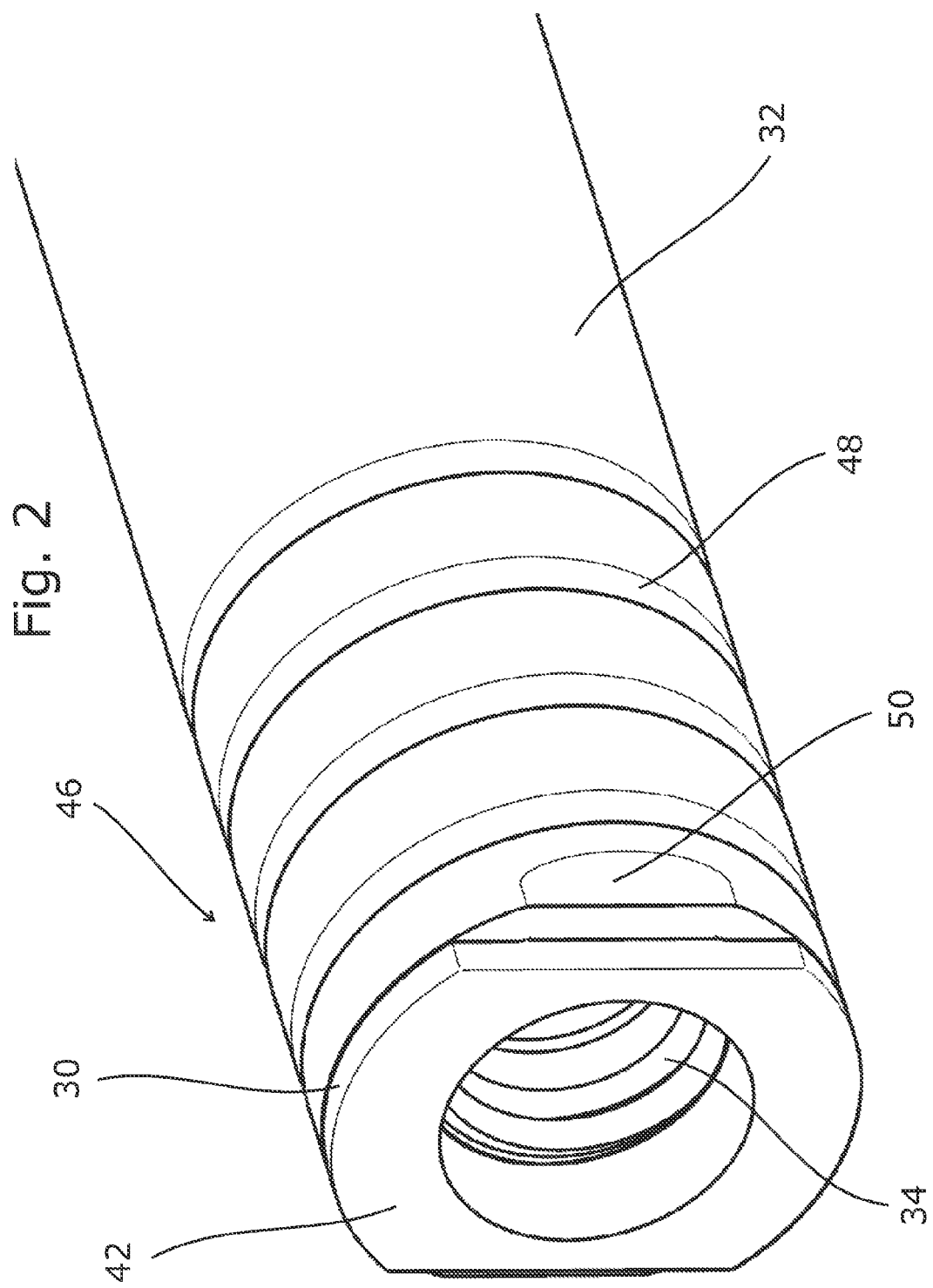
FIG. 2 shows a perspective view of a front end portion of the nut unit of FIG. 1.

FIG. 4 shows the already deformed state of the tube section 32. By grooving in a total of four grooves 48, material of the tube section has been introduced into the area of the recesses 38. The deformation is plastic. A sufficiently strong connection in the axial direction is thus achieved. Twisting would still be possible. This is achieved by the deformation of the tube section near its first end portion 46 at the recesses 40; the deformed state can be seen from the FIGS. 1 and 2; reference is made to the flattened portion 50.

An attachment area 52 is disposed on a second end portion of the tube section. It has a bore or eyelet 56, the center of which lies on the spindle axis 26. The attachment area 52 can be configured in any way.

The tube section 32 has an axial length substantially adapted to the axial length of the spindle 24. The axial length is significantly larger than the axial length of the nut 30, in particular at least three times and preferably six times as large. With its inner space, which is located between the nut 30 and the attachment area 52, the tube section accommodates the protruding part of the spindle 24 and thus protects this part of the spindle against dirt, mechanical damage, jamming parts adhering and the like.

In the second exemplary embodiment according to FIG. 5, the nut 30 does not have a shield 42. In the assembled state of the nut unit, as shown in FIG. 5, the nut protrudes a few millimeters axially over the tube section 32. A recess 40 extends parallel to the plane of the paper. An axial connection in the area of the recesses 38 is realized as in the first exemplary embodiment.

Figure 5A:
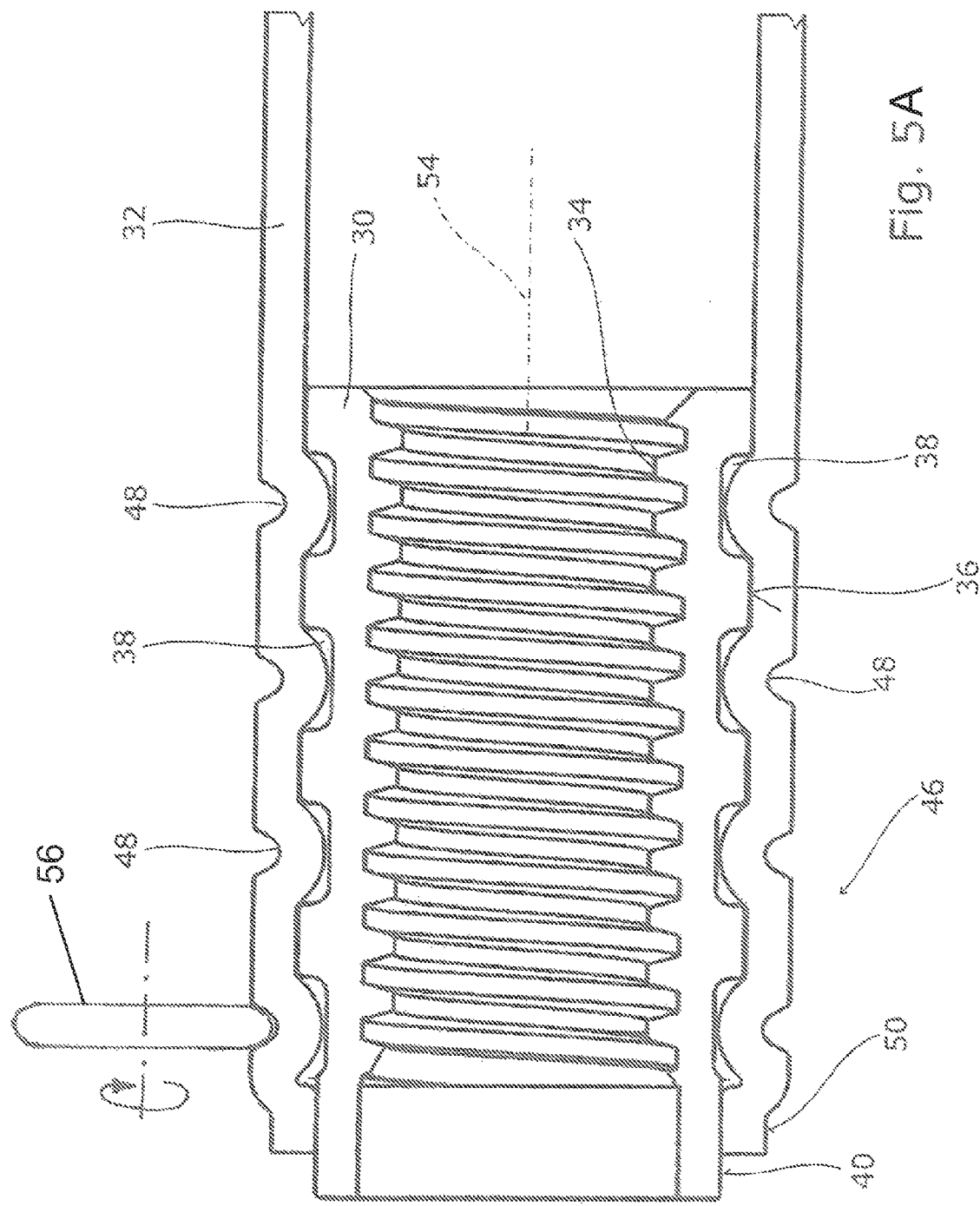
FIG. 5A shows the nut unit shown in FIG. 5 during production.

In the method for producing the spindle drive, the nut unit is produced as follows, with further reference to FIG. 5A.

Due to its production process, a nut made of plastic is already provided with recesses 38 and 40, or recesses are added later. A tube section 32 is provided; it has a round cross-section and an internal dimension corresponding to the external dimension of the nut 30. Its external dimension is limited by a cylinder. The recesses 38, 40 are located within this cylinder.

The tube section is now pushed over the nut either until it arrives at the stop 44 or until a desired position has been reached. The material of the tube section 32 is now deformed. Grooves 48 are produced in a first deforming step, they are made so deep so as to be free of clearance and preferably reach the bottom of the furrows 38. Even if that is not the case, they abut the edges of the furrow 38 in any case and secure a firm connection in the axial direction. In a second deforming step, the material of the tube section 32 is pressed against the recess 40; flattened portions 50 are thus created. In this state, the nut unit 28 is completed and can be screwed onto the spindle 24.

In detail, the processes proceed as follows: The nut 30 is first screwed onto the spindle 24. The assembly group thus obtained is then introduced into the tube section 32. When the recesses 40, seen in the axial direction, are provided one after the other, the deformations are carried out individually one after the other. To begin with, this is started with the recess 38 which closest to the attachment area 52 or the farthest from it. Then, a deformation by forming a groove 48 is carried out for the next recess 38, etc. Thus, the process is carried out step-by-step in an axial direction 54. The deformations are carried out in particular by roller burnishing. During deformation, the tube section 32 can move in the axial direction 54 relative to the nut 30.

During furrowing, the roller burnishing tool 56 is not applied in a radial plane extending centrally relative to the recess 38, but in a radial plane which is offset therefrom in the axial direction by a certain amount. The offset is preferably between about 0.1 mm and about 1 mm. The offset is effected in the direction opposite to the direction of the progress of the deformation steps. Roller burnishing starts at that flank of the processed recess 38 which is farther away from the recess which is subsequently processed than the center of this processed recess. Because the tube section 32 shortens during deformation, the tool holding the nut unit 28 during deformation needs to be disposed so as to be appropriately moveable.

The transition of the recess 38 into the outer jacket 36 is formed (seen in the sectional view) by an angle within the angular range of about 70° to about 90°. The angle is not rounded or at its tip, but as sharp-edged as possible.

Figure 6:
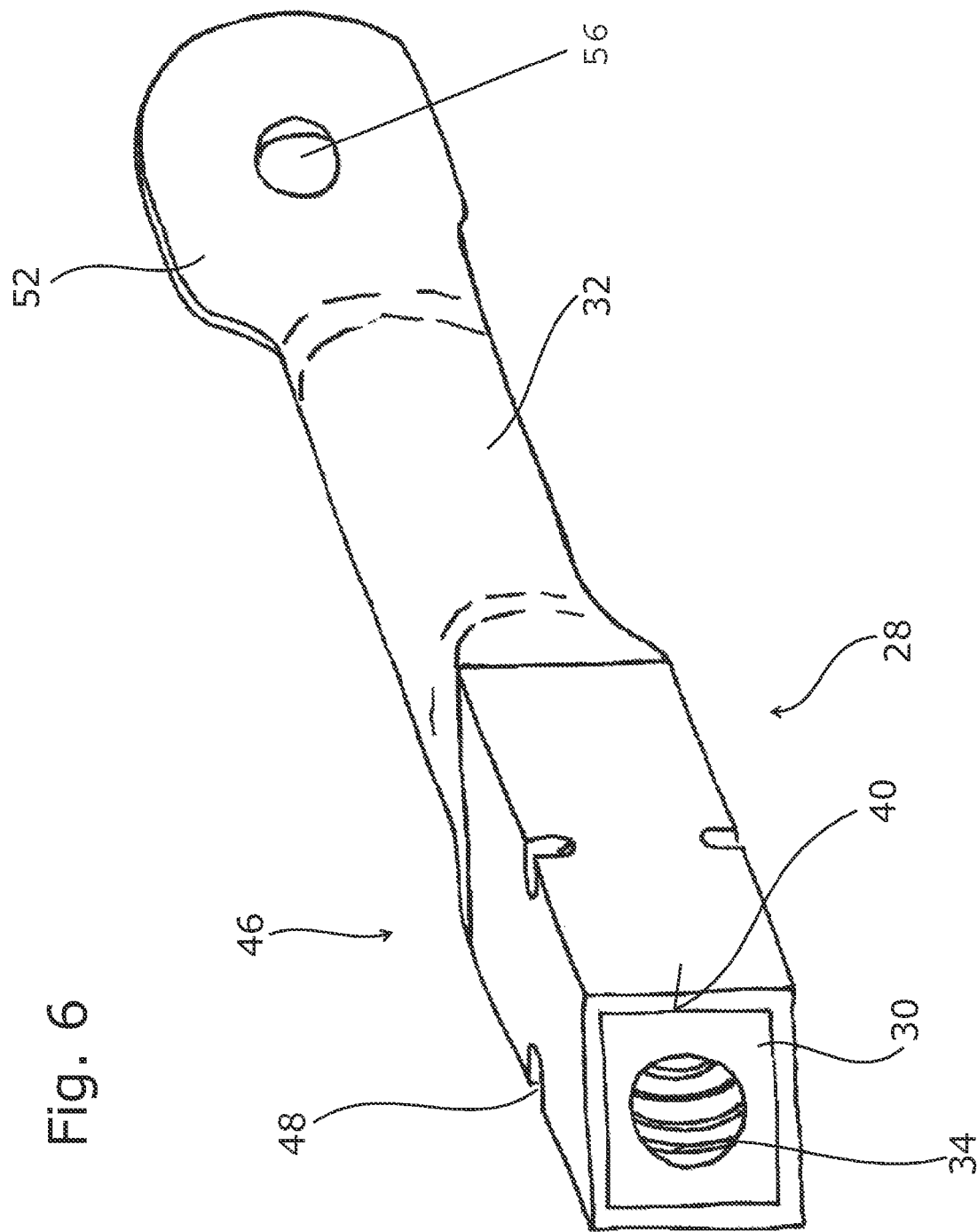
FIG. 6 shows a perspective view of a nut unit consisting of a tube section and a nut in the assembled state according to another embodiment.

In the embodiment according to FIG. 6, a tube section 32 is used which has a square cross-section over a partial area of its axial length. A nut 30 is used which is substantially prismatic with a square base. Its outer jacket is substantially formed by four rectangles. They are each set at an angle of 90° relative to one another. These rectangles at the same time form the non-round contact surface 40. In the outer jacket 36, four recesses 38 disposed in a radial plane are provided, each of which extends only over a small angular range, for example, about 10° to about 30°. In order to establish the connection between the tube section 32 and the nut 30, the material of the tube section 32 is again deformed. A roller burnishing tool, as it is used in the preceding exemplary embodiment, is used for this purpose. The recesses 38 have a bottom limited by a circular line which is centric to the axial direction. The deformation can thus be carried out by means of a peripherally moving tool. In an alternative, the arrangement of nut 30 and tube section 32 is rotated about the longitudinal axis and the tool is stationary. The grooves 48, as they are shown in FIG. 6, are obtained. Thus, FIG. 6 shows that the recesses 38 need not extend over 360°, as is the case in the preceding exemplary embodiment.

In an alternative, it is also possible to provide other deformations instead of a deformation by roller burnishing, such as spinning or pressing tools that lead to a deformation as it can be seen from the Figures. Instead of the square cross section shown, the cross section of the nut 30 can also be a different regular polygon; the cross-section can also be a different non-round shape.

It may be readily understood by those having skill in the pertinent art from the present disclosure that any of numerous changes and modification may be made to the above described and other embodiments of the present invention without departing from the spirit and scope of the invention, which is limited herein only by the appended claims. Accordingly, this detailed description of alternative embodiments of the present invention is to be taken in an illustrative, as opposed to a limiting sense.

What is claimed is:

1. A method for producing a spindle drive of an adjustment device of a motor vehicle seat, the method comprising:
    assembling a spindle, an electric motor for driving the spindle a nut unit comprising a nut made from plastic, an internal thread placed into engagement with the spindle, and an outer jacket delimited by a cylinder and having recesses defining at least one peripheral furrow, and a retainer configured as a tube section having an inner space generally adapted to the outer jacket, wherein the assembling step includes the following:
    arranging the tube section and the nut substantially coaxially,
    pushing the tube section over the nut during assembly,
    locating the nut within the tube section,
    deforming the tube section in areas in which the recesses of the nut are located toward the inside and into an area of the recesses, and forming annular deformations reaching into at least some of the recesses so that a portion of material of the tube section is located in the recesses, and
    retaining the nut in the tube section.

2. A method according to claim 1, wherein the recesses include at least one non-round contact surface therein.

3. A method according to claim 1, wherein the tube section includes a hollow tube section at least about three times as long in an axial direction as the nut.

4. A method according to claim 1, wherein the tube section has a first end portion, and the nut is fixed at the first end portion of the tube section.

5. A method according to claim 1, wherein the tube section comprises a second end portion and an attachment area at the second end portion.

6. A method according to claim 5, wherein the attachment area comprises an eyelet or a bore.

7. A method according to claim 1, wherein the nut includes a stop adapted to abut a first end portion of the tube section.

8. A method according to claim 1, wherein the tube section includes a hollow tube section at least about six times as long in an axial direction as the nut.

9. A method according to claim 1, wherein the retainer and the nut are different materials.

10. A method according to claim 1, wherein the tube section is formed from plastic.

11. A method according to claim 1, wherein the deforming step comprises one or more of a rolling process, an embossing process, or a roller burnishing process.

12. A method according to claim 1, wherein the at least one furrow has no pitch.

13. A method according to claim 12, wherein several of said at least one furrow are arranged axially one behind the other.

14. A method according to claim 1, wherein the tube section is a material that can be one or more of cold-formed or hot-formed.

15. A method according to claim 1, further comprising forming the at least one furrow by a lathing process.

* * * * *